United States Patent [19]

Slaughter, Jr.

[11] Patent Number: 5,462,702

[45] Date of Patent: Oct. 31, 1995

[54] METHOD FOR RESURFACING FIBERGLASS BOAT HULLS

[76] Inventor: Gibbs M. Slaughter, Jr., Rte. 9, Box 146-B, Fort Worth, Tex. 76179

[21] Appl. No.: 122,728

[22] Filed: Sep. 16, 1993

Related U.S. Application Data

[63] Continuation-in-part of Ser. No. 830,837, Feb. 4, 1992, Pat. No. 5,246,642.

[51] Int. Cl.⁶ .................. B29C 35/02; B29C 73/00; B32B 35/00
[52] U.S. Cl. .................. 264/36; 156/232; 156/245; 264/135; 264/220; 264/225; 264/227; 264/313; 264/DIG. 59; 425/11; 425/12
[58] Field of Search .................. 264/135, 136, 264/36, 219, 220, 224, 225, 226, 227, 313, DIG. 59; 425/11, 14, 12, 13, DIG. 238; 156/232, 245, 244.16

[56] References Cited

U.S. PATENT DOCUMENTS

| | | | |
|---|---|---|---|
| 1,979,132 | 10/1934 | Zinser | 264/220 |
| 3,061,500 | 10/1962 | Kreier, Jr. | 264/313 |
| 3,215,763 | 11/1965 | Buerger | 264/220 |
| 4,061,516 | 12/1977 | George et al. | 264/36 |
| 4,329,385 | 5/1982 | Banks et al. | 264/220 |

Primary Examiner—Jay H. Woo
Assistant Examiner—Duane S. Smith
Attorney, Agent, or Firm—Robert A. Felsman; Mark D. Perdue

[57] ABSTRACT

A method of replicating surface textures by providing a laminar, dimensionally stable, flexible mold having an impression of the surface texture to be formed on one side thereof, applying a layer of fluid casting material to the flexible mold, and partially curing the resinous material wherein the impression is transferred to the partially cured resinous material. The flexible mold and layer of partially cured resinous material are then secured to a recipient surface, and the material is fully cured, and the flexible mold removed, leaving a surface texture on the recipient surface:

11 Claims, 10 Drawing Sheets

METHOD FOR RESURFACING FIBERGLASS BOAT HULLS

BACKGROUND OF THE INVENTION

1. Cross-Reference to Related Application

This application is a continuation-in-part of application Ser. No. 07/830,837, filed Feb. 4, 1992, now U.S. Pat. No. 5,246,642, Sep. 21, 1993.

2. Field of the Invention

This invention relates generally to a method forming surface textures on contoured objects, specifically to a method for replicating the surface textures on fiberglass boat hull surfaces.

3. Background Information

Many fiberglass boats have surface textures embossed on decks or other surfaces of the hull. These surface textures may have a variety of patterns and serve aesthetic and utilitarian functions. Some of the surface textures are designed to imitate an aesthetically appealing surface, such as wood grain or the like. Other surface textures are designed to provide a non-skid surface upon decks, hatch covers, or other boat surfaces.

Common damage sustained by fiberglass boats after a collision or other accident includes cracking and general crushing of the hull. Repair of damaged fiberglass entails reconstruction of the damaged segment of fiberglass. If the damaged section of the boat hull had a surface texture embossed upon it before the damage occurred, the repair process generally results in the elimination of the surface texture. An expensive boat that is structurally repaired, but aesthetically or functionally impaired, may be depreciated badly in value by the repair. It is therefore desirable to replicate the surface texture on the newly repaired section of fiberglass. Replication of this surface texture after repair renders the repair job more aesthetically pleasing, and preserves the non-skid characteristics of the original, unrepaired boat hull surface. Such an improved repair preserves the value of an expensive boat.

It is a current practice in the fiberglass boat repair industry to form a rigid surface mold conforming to the contour of the boat hull surface to be repaired and having a negative impression of the surface texture to be replicated formed thereon. This procedure has a number of drawbacks. Because a boat hull surface has a multitude of contours and compound curves, an individual surface mold must be made for each particular hull section to be repaired. Such a procedure is time-consuming and costly. Furthermore, because these prior art molds are rigid, gas entrapped in the fluid casting material is difficult to force out and may leave cavities or other defects in the repaired surface. The prior art surface repair processes using rigid molds are costly, time-consuming, and often produce less than adequate repairs.

SUMMARY OF THE INVENTION

It is the general object of the present invention to provide a method for forming surface texture on contoured surfaces. This and other objects are achieved by providing a laminar, dimensionally stable, flexible mold having an impression of the surface texture to be formed on one side thereof, applying a layer of fluid casting material to the flexible mold, and partially curing the resinous material wherein the impression is transferred to the partially cured resinous material. The flexible mold and layer of partially cured resinous material are then secured to a recipient surface, and the material is fully cured, and the flexible mold removed, leaving a surface texture on the recipient surface.

Other objects, features, and advantages of the present invention will become apparent with reference to the Figures and Detailed Description, which follow.

DESCRIPTION OF THE DRAWINGS

FIG. 2a is an enlarged plan view of a damaged section of the fiberglass boat hull shown in FIG. 1a.

FIG. 2b is an enlarged plan view of a repaired section of the fiberglass boat hull shown in FIGS. 1a and 2a.

DESCRIPTION OF THE PREFERRED EMBODIMENT

Figures 1, 1A:
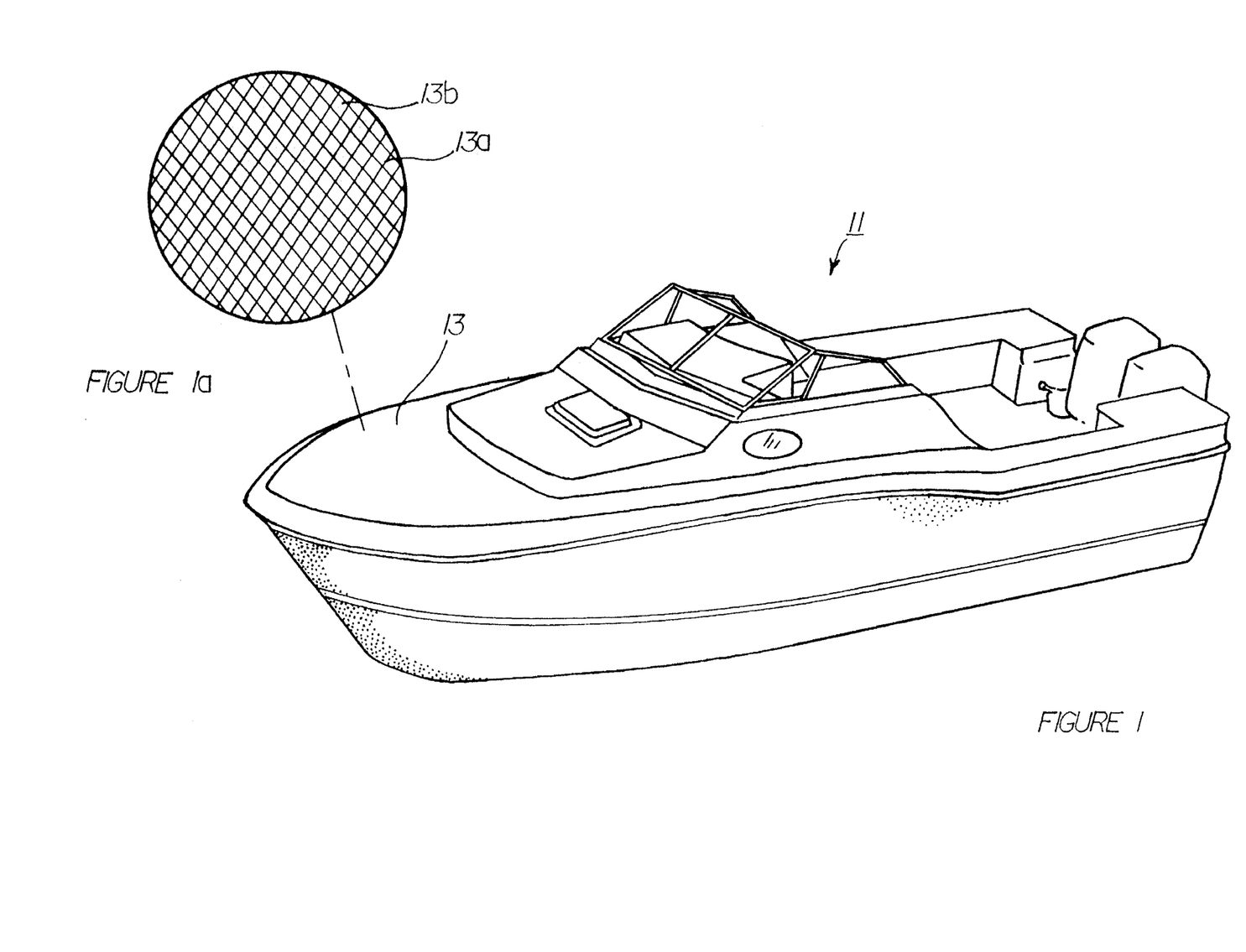
FIG. 1 is a perspective view of a typical boat having a fiberglass hull with a surface texture formed thereon.
FIG. 1a is an enlarged plan view of a section of fiberglass boat hull surface having a surface texture embossed thereon.

FIG. 1 shows a typical boat 11 having a fiberglass hull. Although the boat shown is a powerboat, the present invention is equally applicable to any sort of boats having fiberglass hulls. The boat 11 has a number of surfaces 13. All or some of the surfaces 13 may have a surface texture 13a, 13b embossed on them.

FIG. 1a is an enlarged view of the boat surface 13 illustrating the surface texture 13a, 13b in greater detail. The surface texture 13a, 13b shown is rather typical, and has a plurality of depressions 13a that bound and define the diamond-shaped raised portions 13b. Such a diamond-shaped surface texture generally is adapted to be a non-skid surface for providing good traction and secure footing when the boat surface is wet or otherwise rendered slippery. Other surface texture patterns (not shown) may be adapted to perform an aesthetic enhancement function, such as imitation woodgrain, basketweave, or the like.

Figure 2A:
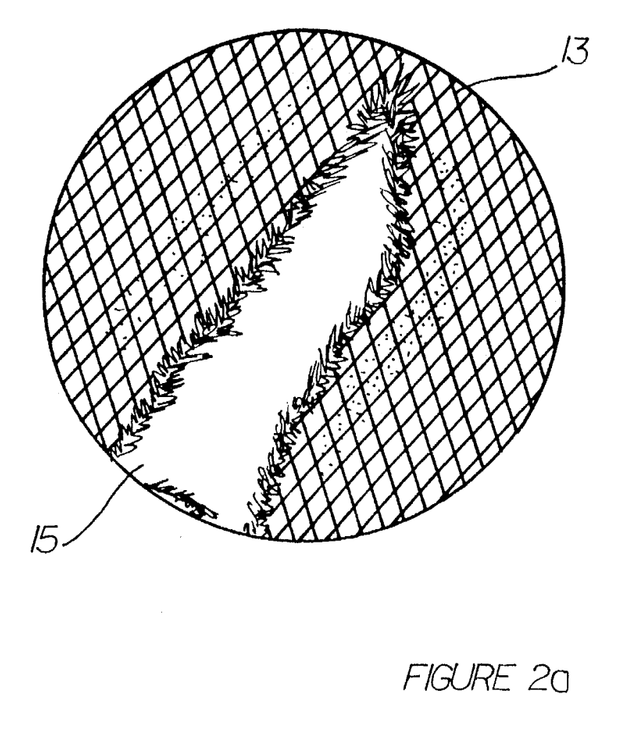

The surface texture 13a, 13b is embossed on and integral with the underlying fiberglass boat hull surface 13. Because of the integral nature of the surface texture, any damage occurring to the boat hull surface 13 logically will affect the surface texture 13a, 13b. FIG. 2a shows an enlarged section of damaged boat hull surface 13. Typical damage comprises cracks and generally crushed fiberglass surfaces. Such damage may result from collisions or other accidents. Clearly, the surface texture 13a, 13b embossed on the damaged surface 13 is damaged as well. Typical fiberglass boat hull repair techniques (not shown) involve reforming the underlying fiberglass structure using fiberglass matting or cloth and resinous material.

Figure 2B:
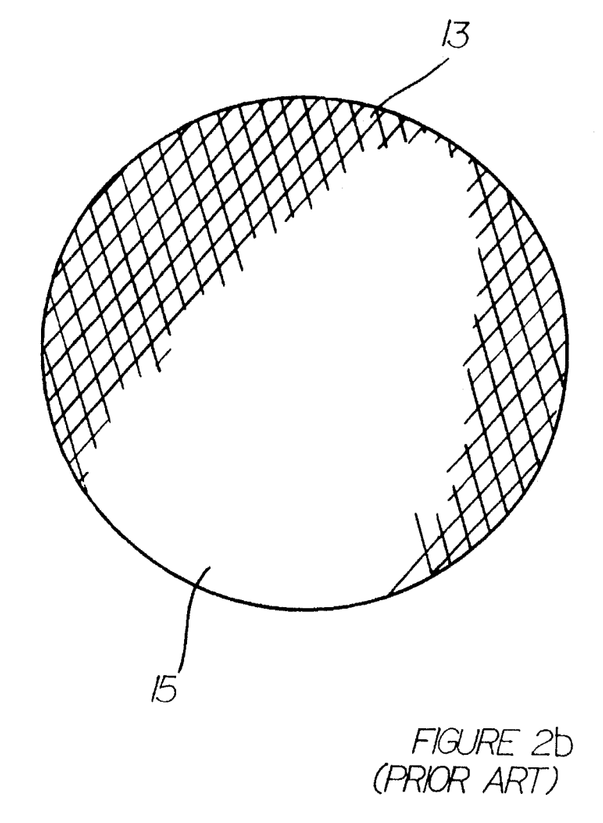

FIG. 2b depicts the surface 13 of FIG. 2a after a typical structural repair. The formerly cracked surface area 15 is structurally restored, but no longer has the surface texture 13a, 13b on it. Such a repair is aesthetically displeasing for obvious reasons, and is functionally inadequate because the repaired surface no longer has its former non-skid characteristics. Such a repair may result in significant depreciation of the value of the repaired boat.

The first group of steps of the method of the present invention involve the formation of an improved mold for effecting surface repairs on structurally repaired boats. The second group of steps describes the method for repairing surface textures using the mold formed according to the first group of steps. Although the method is described with respect to surface repair of structurally repaired boat surfaces, the method has equal utility in replicating surface textures on previously undamaged boat surfaces that were originally fabricated with no surface texture embossed thereon.

Figure 3:
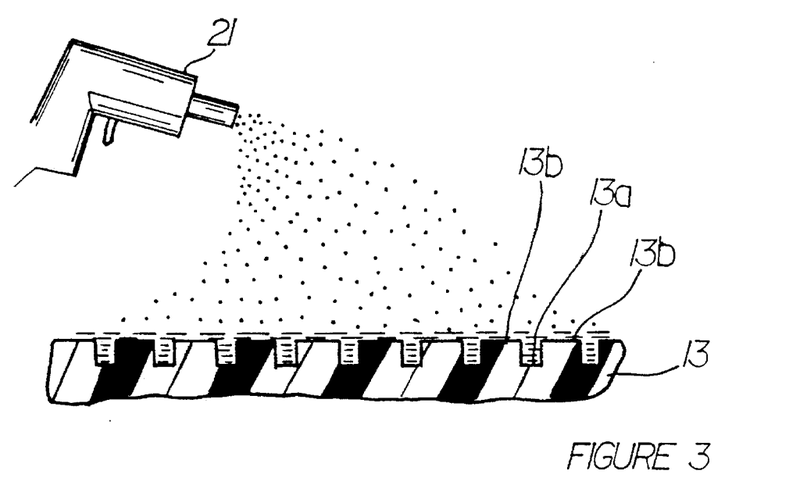
FIGS. 3–7 are an enlarged, cross-sectional views of steps of the method according to the present invention.

Referring now to FIG. 3, the first group of steps of the method of the present invention will be discussed. As a preliminary step, an undamaged model surface 13 of the fiberglass boat hull is selected. The model surface 13 need not be on the same boat being repaired, it could be a different boat entirely, or any item having an appropriate surface texture formed on it. The model surface 13 selected must have a sufficiently large area of undamaged surface texture 13a, 13b embossed upon it to cover the boat hull surface to be repaired. For reasons that will become apparent, the model surface 13 need not have the same surface contours as the recipient surface (shown at 15 in FIG. 7).

A laminar flexible mold is formed on the model surface 13 by applying a first layer 23 of a fluid resilient mold material. The fluid resilient mold material 23 must be initially fluid or semi-fluid, and capable of curing to a state having the properties of pliability and flexibility. The resilient mold material 23 also must possess the ability to fill depressions 13a that bound and define the surface texture of the model fiberglass boat hull surface 13. One such fluid resilient mold material is "25-YEAR SILICONIZED ACRYLIC CAULK," manufactured and sold by the Macklenburg-Duncan Company of Oklahoma City, Oklahoma. While the resilient mold material is shown being applied by a spray gun 21, it will be appreciated that the resilient mold material 23 may be applied using a trowel, spatula, or the like.

Figure 4:
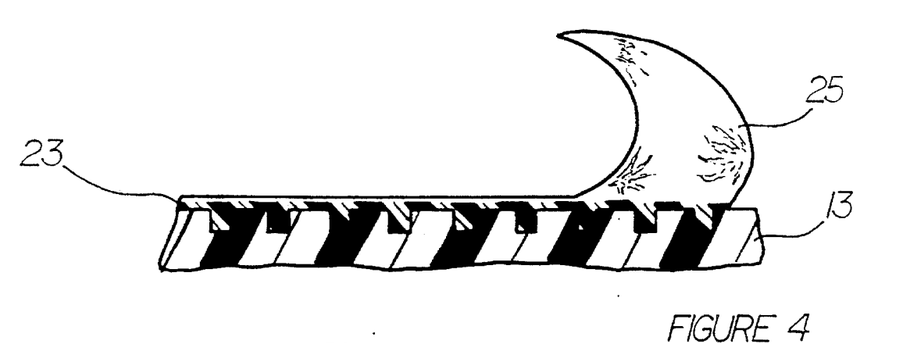

FIG. 4 illustrates the next step in the method of present invention. After the first layer 23 of resilient mold material is cured, a layer of reinforcing material 25 is adhered or bonded on top of the first layer 23 of resilient mold material. The bonding may be accomplished using conventional adhesives, or by applying a very thin or light coat of resilient mold material to the first layer 23. This reinforcing material should be pliable, yet have sufficient tensile strength to render the completed mold rip- and tear-resistant. Additionally, the reinforcing layer 25 should give the completed flexible mold dimensional stability required to for the mold to function properly in the surface texture replication process. It has been found that woven fiberglass boat cloth or matting makes an excellent reinforcing layer 25. It should be appreciated, however, that any sort of fibrous, preferably woven, reinforcing material may suffice.

Figure 5:
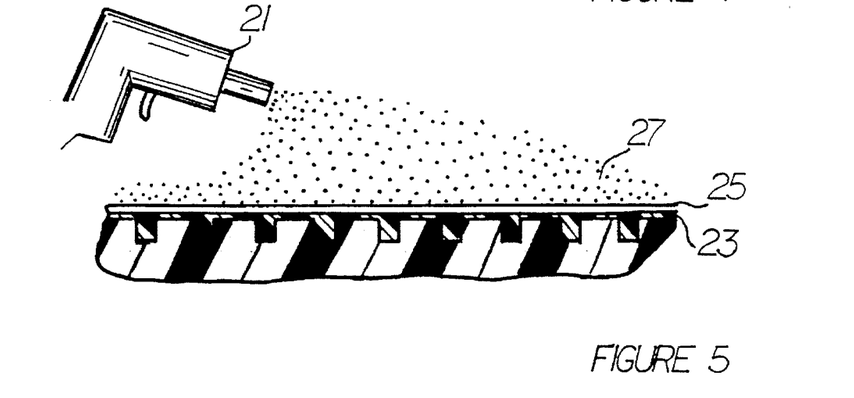

FIG. 5 illustrates a third step in the laminar flexible mold-forming process. A second layer 27 of resilient mold material is applied atop the first layer 23 of resilient mold material and the layer 25 of reinforcing material. Again, the second layer of resilient mold material 27 is shown being applied by a spray gun 21, but any other suitable method may be used. The second layer of resilient mold material serves to bond and unitize the first layer 23 of resilient mold material and the layer of reinforcing material 25.

The next step in the method of the present invention is curing the resilient mold material. The aforementioned siliconized acrylic caulk requires no special curing procedure. That material cures over time at room temperature. It will be appreciated, however, that other resilient mold materials, which require special curing procedures, may be used.

Figure 6:
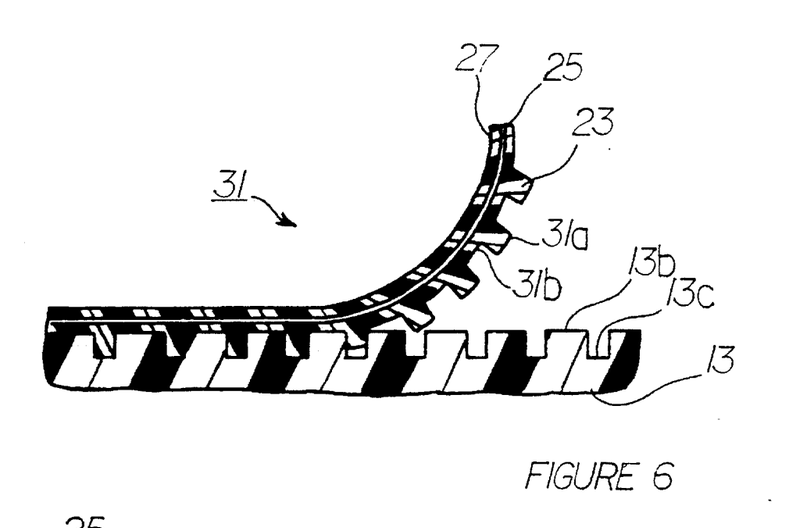

FIG. 6 illustrates the removal of the flexible mold 31 from the model surface 13 of the fiberglass boat hull. The flexible mold 31 is comprised of the first layer of cured resilient mold material 23 having a negative impression 31a, 31b of the depressions 13a and raised portions 13b comprising the surface texture on the model surface 13. The flexible mold is further comprised of the layer of reinforcing material 25 and the second layer 27 of resilient mold material.

It has been found that removal of the flexible mold 31 from the model surface 13 is facilitated by applying a mold-release substance to the model surface 13 prior to applying the first layer 23 of fluid resilient mold material. A waxy mold release material is necessary for use with the aforementioned siliconized latex caulk mold material because the mold material is water-based. Other conventional mold-release materials, such as polyvinyl alcohol, or others, may be appropriate for use with other mold materials.

Figure 8:
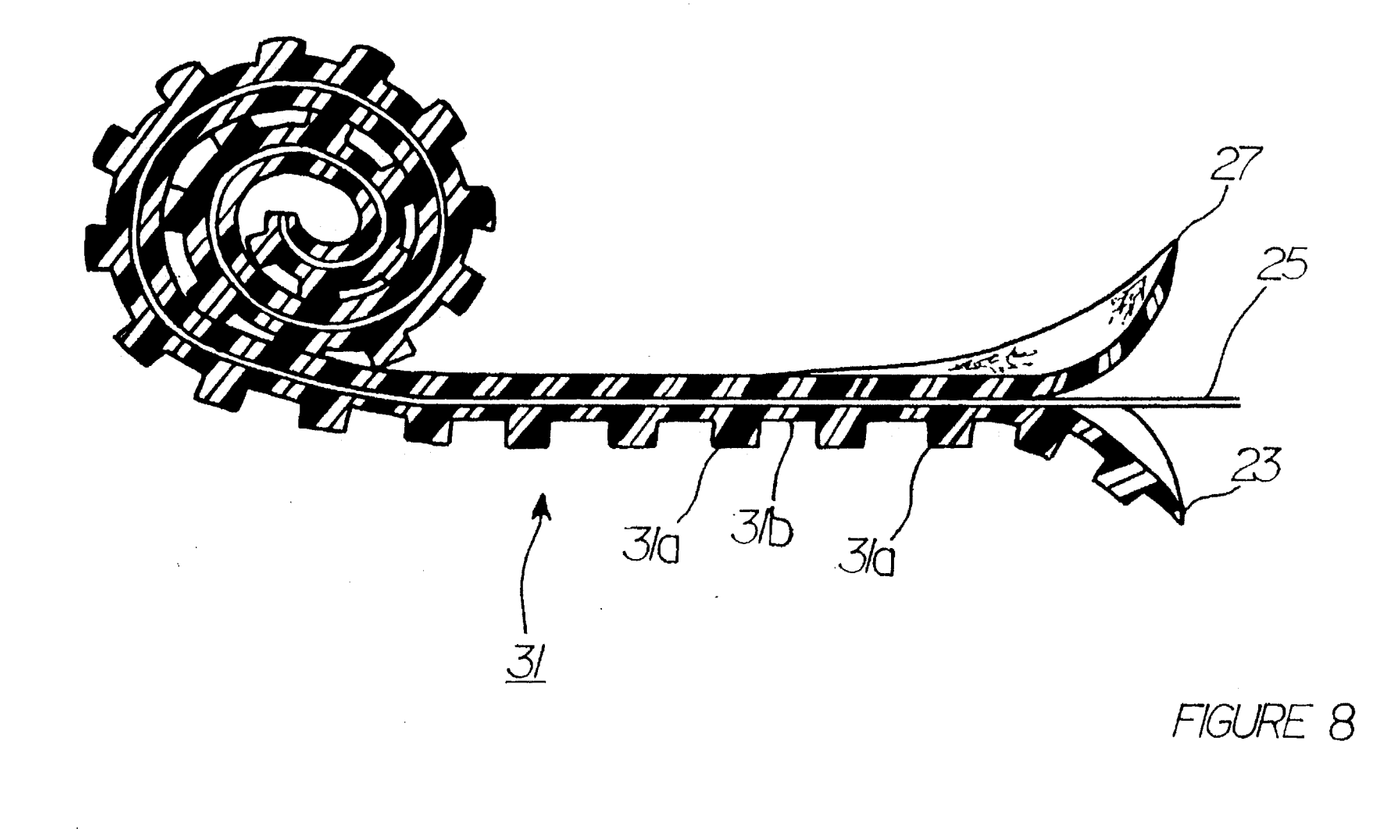
FIG. 8 is a sectional perspective view of a laminar flexible mold formed according to the invention.

FIG. 8 illustrates the laminar flexible mold 31 after it is removed from the model surface 13 of the fiberglass boat hull. The flexible mold 31 is pliable, capable of being rolled, bent, or otherwise conformed to any surface contour, and also is thin, lightweight, and easily transported. The first layer 23 of cured resilient mold material has a negative impression 31a, 31b of the surface texture 13a, 13b formed thereon. The layer of reinforcing material 25 gives the mold 31 structure, rendering it durable and tear-resistant, as well as giving the mold 31 dimensional stability necessary for its proper function.

Figure 7:
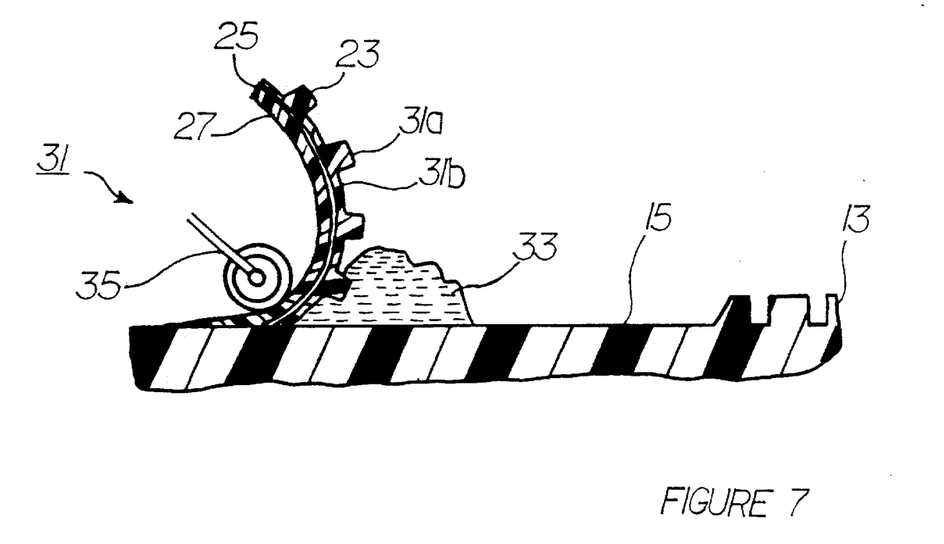

With reference now to FIG. 7, the use of the flexible mold 31 in replicating surface textures on fiberglass boat hulls will be discussed. A recipient fiberglass boat hull surface 15 is prepared in a conventional manner, as for any painting or other repair operation. A typical surface preparation includes masking, sanding, and degreasing the recipient surface 15 to provide a clean, dry surface for adhesion of a repair material. Regardless of the preparation employed, the recipient surface 15 should be clean, chemically compatible with the repair materials, and generally prepared for quality bonding with the repair material. Furthermore, the recipient surface 15 should be sanded to a depth appropriate to receive repair material such that the resulting surface texture replica will be flush with the original, undamaged, surrounding surface. If the surface is sanded too deeply, the resulting surface texture replica will have a depressed or "caved in" look that is unsatisfactory.

After preparation of the recipient boat hull surface 15, the flexible mold 31 is placed upon and affixed at one or more of its edges to the surface area 13 surrounding the recipient boat hull surface 15. If it is desired to replicate a surface texture where the surrounding surface area 13 has the same texture, the flexible mold 31 must be carefully positioned to achieve continuity of the replicated surface texture from the surrounding surface areas 13 to the recipient surface area 15. It has been found that this may be accomplished by "feel," because it becomes apparent to the touch when the negative impression of the surface texture 31a, 31b is in meshing engagement with the surface texture on the surrounding surface areas 13 of the boat hull. After the flexible mold 31 is positioned appropriately on the area surrounding the recipient surface area 15, it should be affixed thereto at one or more of its edges by masking tape or the like to maintain the proper positioning with respect to the recipient surface 15.

The flexible mold 31, which is attached at one or more of its edges to the recipient surface 15, is peeled or folded back to expose the area of the recipient surface 15. Next, a mass of fluid casting material 33 is placed on the recipient boat hull surface 15. The fluid casting material 33 is commonly known in the fiberglass boat industry as "gel-coat." Gel-coat may consist of any of number of polymeric substances, including epoxies, polyester resin, or reinforced polyester resin. Any of these materials are satisfactory for use in the method of the present invention, but should be conventionally and appropriately pigmented and catalyzed for use upon the recipient surface 15.

The flexible mold 31 is then placed over the casting material, and pressure is applied to the flexible mold 31, such that a "wave" of the casting material 33 is pushed ahead of the mold. The pressure is applied from the fixed edge of the flexible mold toward the edges of the recipient surface until the flexible mold 31 and casting material 33 have been compressed over the entire recipient surface 15 area. Pressure is applied to the upper surface 27 of the mold 31 to distribute the casting material 33 over the recipient surface 15, and to transfer the negative impression 31a, 31b of the surface texture to be replicated to the fluid casting material 33. The compression also serves to expel (or permit to escape) entrapped gas from the layer of fluid casting material 33. This is an important step to the successful replication of the surface texture 13a, 13b because the presence of entrapped gas bubbles will leave undesirable cavities and porosities in the cured surface texture repair. It is this step that could not occur using prior art rigid mold techniques.

In FIG. 7, a roller 35 is shown for application of pressure to the flexible mold. The compression may be accomplished in a number of ways including rollers, trowels, squeegees, or the like. At this point in the method, considerable skill is required for a successful replication of the surface texture. To insure that the mass of fluid casting material 33 is of a uniform and adequate thickness over the recipient surface 15, the upper surface 27 of the flexible mold must be carefully scrutinized to detect undue bulges, depressions, or the like, indicating a nonuniform distribution of the fluid casting material 33 over the recipient surface 15. If, upon inspection, bulges or depressions are detected, further compression should be applied to the mold 31 until the bulges or depressions are eliminated.

It also has been found useful to produce a shiny, reflective surface on the upper layer 27 of the flexible mold 31. This shiny, reflective surface functions to permit easier observation of the upper surface 27 of the flexible mold for detecting undue bulges or thickness concentrations in the layer of casting material 33. Such a shiny, reflective surface may be produced by coating the upper surface 27 with glossy paint, lacquer, varnish, or the like.

Because of the forces applied to the flexible mold 31 during the surface replication process, the need for the layer 25 of reinforcing material becomes apparent. If the flexible mold is stretched or otherwise distorted during the replication process, the resulting replicated surface texture will be inaccurate and thus not match the other textures 13a, 13b present on the boat hull. The layer 25 of reinforcing material gives the otherwise flexible mold 31 structure and dimensional stability and thus prevents distortion of the flexible mold thereby promoting accurate replication of the surface texture 13a, 13b.

The fluid casting material 33 then is cured to a solid state. This step occurs with the flexible mold 31 remaining in position over the layer of fluid casting material 33. During curing, the casting material 33 hardens and chemically bonds to the recipient surface 15. During hardening, the casting material retains a positive impression of the surface texture 13a, 13b sought to be replicated, thus replicating the surface texture 13a, 13b on the recipient boat hull surface 15. The curing process is conventional and is selected according to the requirements of the fluid casting material 33 or gel-coat used.

After curing the casting material 33 to a solid state, the flexible mold 31 is removed to reveal a replica of the model surface texture 13a, 13b formed on the recipient surface 15. Removal of the flexible mold 31 is facilitated by coating the mold 31 with a conventional mold-release substance prior to positioning the mold 31 upon the recipient surface 15. Some sanding and finish work may be necessary to smooth and feather the replicated surface texture to match that of the surrounding surface areas (13 in FIG. 2b). It will be appreciated that unsatisfactory results may be simply sanded away, and the method repeated until satisfactory results are obtained.

While the method has been described as an essentially continuous process, it should be appreciated that the mold-forming steps need not be repeated each time a particular surface texture is sought to be replicated. The method for forming the flexible mold 31 of the present invention comprises but one stage of the overall method. Once a flexible mold 31 as herein described is formed, the mold 31 may be reused over and over, where the same surface texture is to be replicated. The use of the flexible mold 31 in repairing fiberglass boat hulls by resurfacing a portion of the fiberglass boat hull is the second stage of the method of the present invention.

The method described with reference to FIGS. 3–7 is preferred for repairing relatively small areas of previously textured surfaces. When it is desired to form surface textures on a larger surface area of a fiberglass boat hull or on another contoured surface, such as a plug mold for molding fiberglass boat hulls or other similar surface, the method is preferably modified to accommodate the formation of surface texture on larger surfaces. This alternative embodiment of the method according to the present invention is described below.

Figure 9:
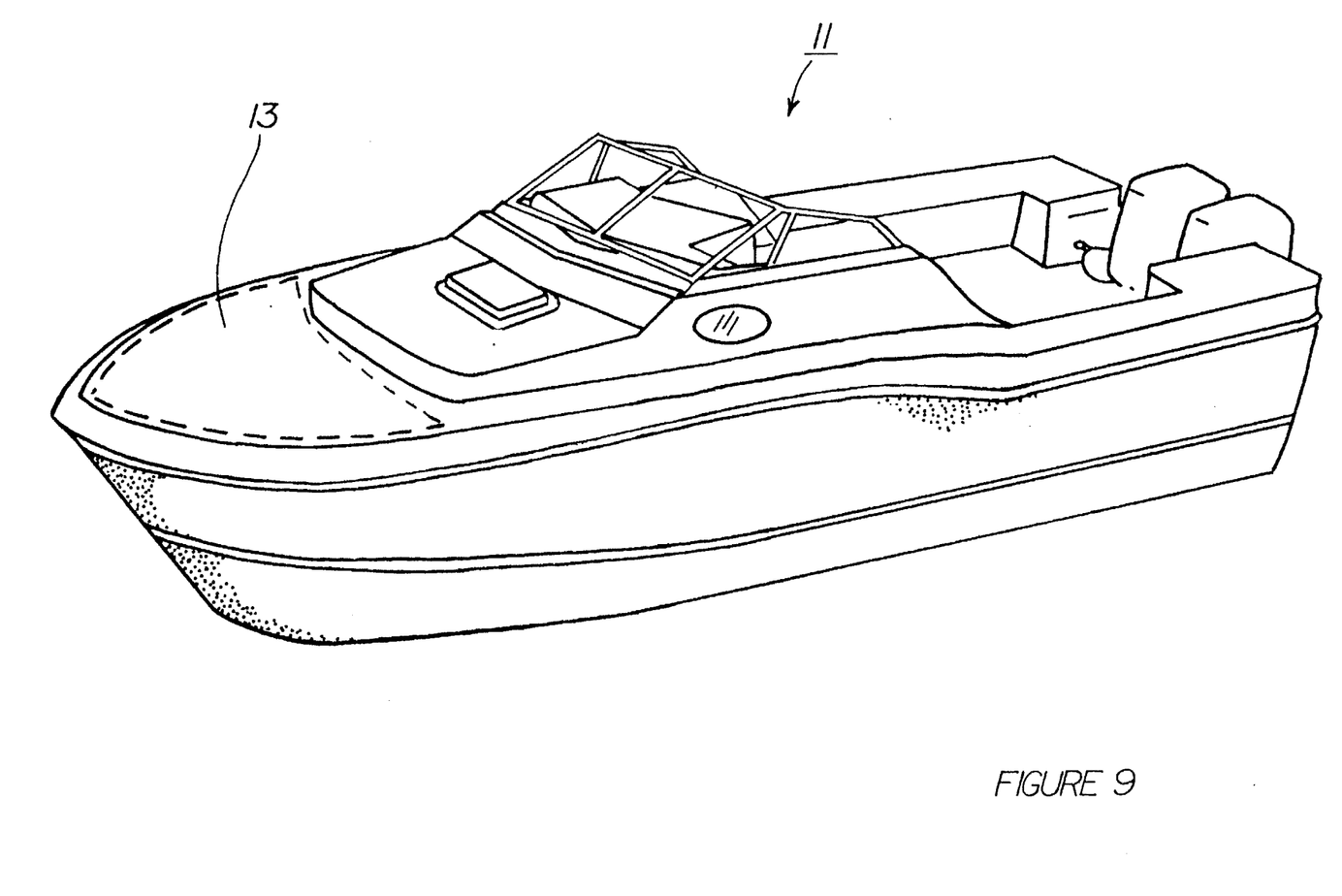
FIG. 9 is a perspective view of a boat having a recipient surface on which a surface texture is to be formed.
Figure 10:
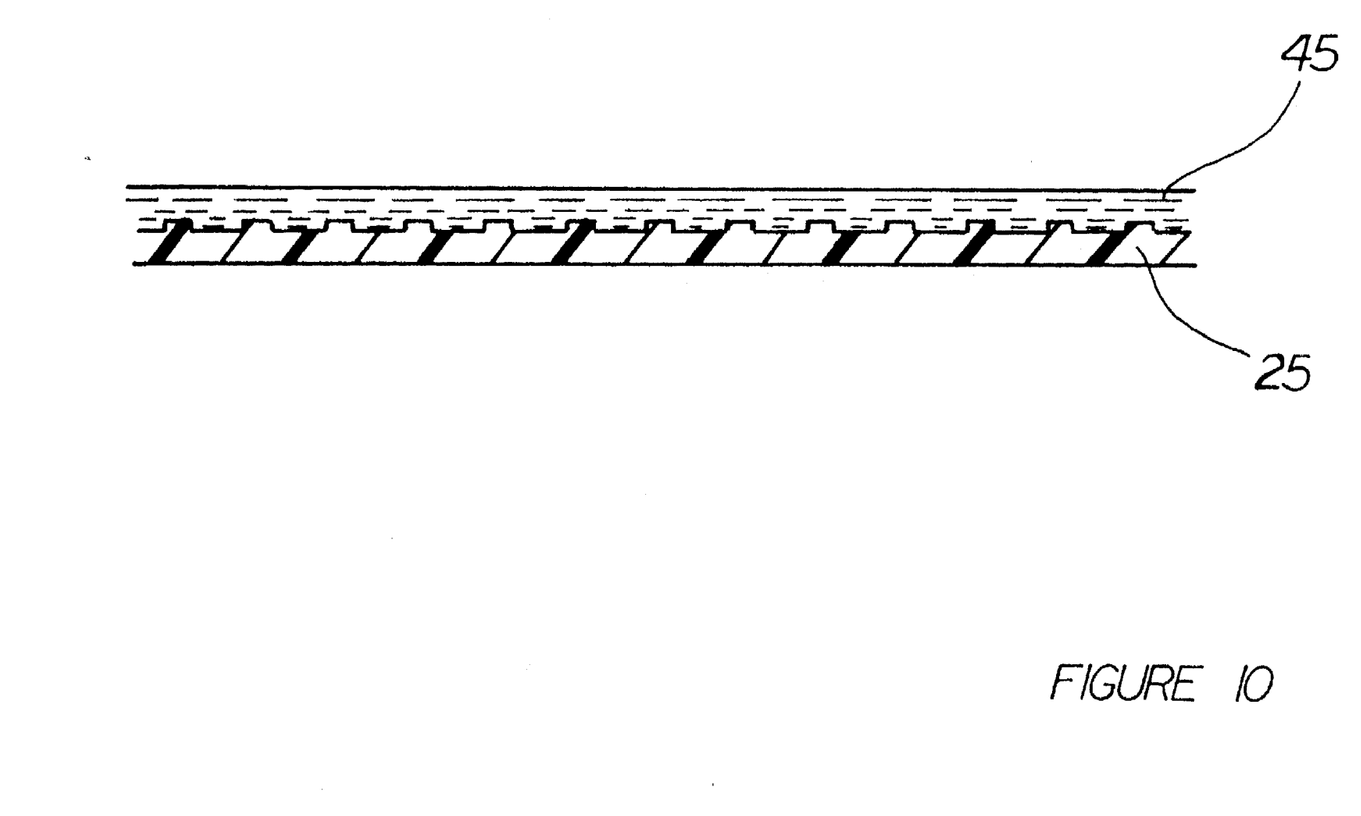
FIG. 10 is an enlarged cross-sectional view of a step of the method according to another embodiment of the present invention.

With reference to FIG. 9, a typical boat 11, similar to that depicted in FIG. 1, is illustrated. Rather than repair of a damaged surface, it is desired to form a non-skid or other surface texture on the entirety of the foredeck 13 of boat 11. Foredeck 13 then becomes the recipient surface. Because foredeck 13 is a relatively large surface, formation of a surface texture thereon must be undertaken according to the alternative embodiment of the method according to the present invention. A flexible mold 25 having an impression of the surface texture to be formed therein, substantially as illustrated in FIG. 8, is provided. Foredeck or recipient surface 13 is prepared in a conventional manner as described above with reference to FIG. 7. A cardboard or heavy paper pattern then is prepared to be substantially coextensive with foredeck 13. The pattern is used to trim flexible mold 25 such that it is also generally coextensive with foredeck 13. Preferably, flexible mold 25 is taped or otherwise adhered to the pattern to add some stiffness or rigidity to mold 25.

A mold release, as discussed above, is preferably applied to the side of flexible mold 25 that has the impression of the surface texture to formed therein. Next, a layer of fluid casting material 45 is applied to flexible mold 25. Layer of fluid casting material 45 may be applied using a spray gun, a trowel, a spatula, or the like, the objective being to obtain a uniform layer 45 over mold 25. A preferred thickness of layer 45 is 0.012 to 0.018 inch. Preferably, fluid mold material is oversprayed or applied to extend over the edge of flexible mold 25 to provide a flat surface for measurement of the thickness.

The next step in the method according to the present invention is to partially cure layer of fluid casting material 45 to a state in which the impression of the surface texture on mold 25 is transferred to layer 45, yet layer 45 remains sufficiently flexible to conform to the contours of foredeck 13 or other recipient surface. It has been found that a partial cure of 80% of the prescribed cure time for the fluid casting material is preferred. A guideline for proper partial curing is that the material may be touched with a finger and no casting material is transferred to the finger.

Figure 11:
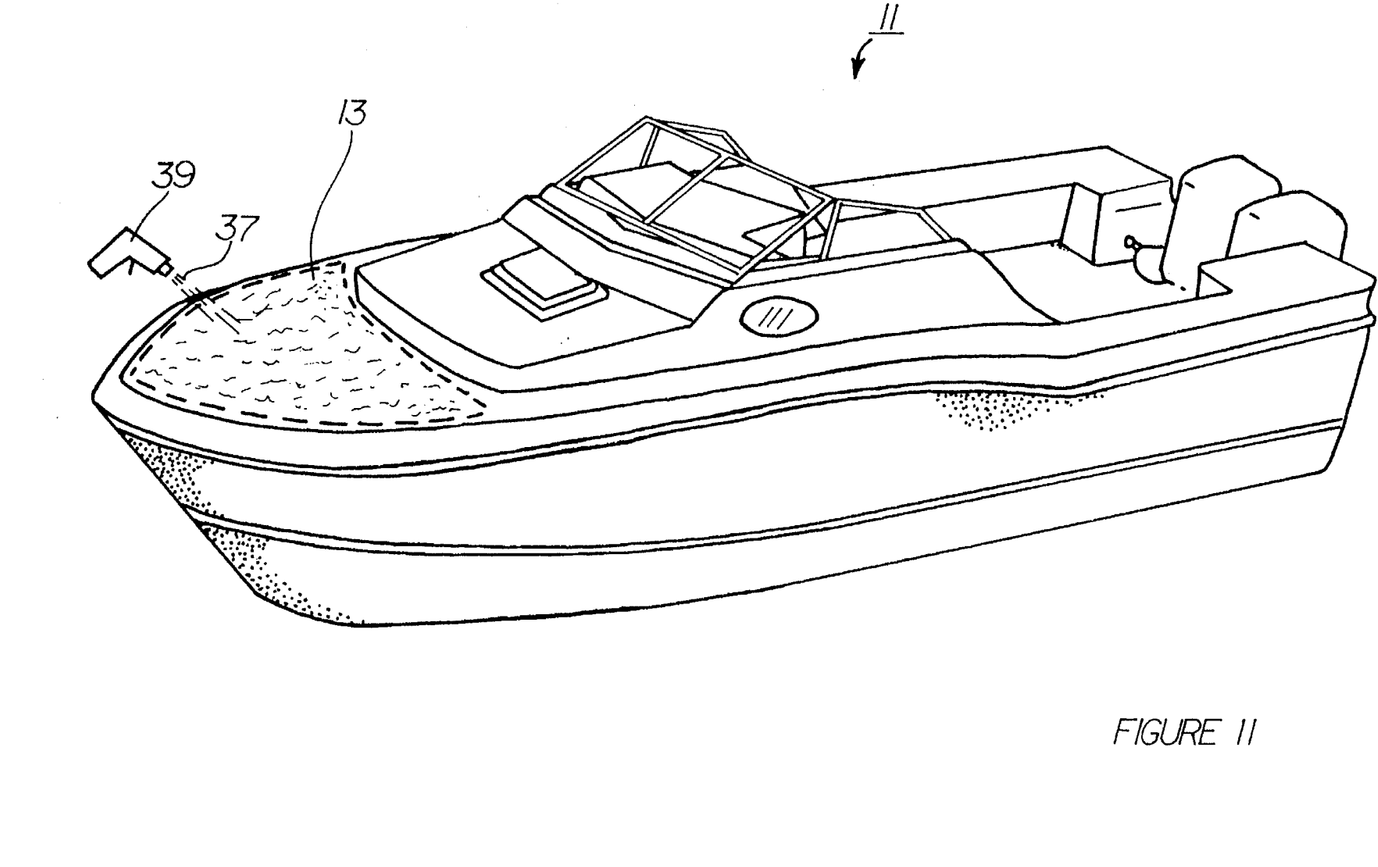
FIGS. 11–13 are perspective action views of steps of the method according to the present invention.

The next step in the method according to the present invention is to secure or adhere flexible mold 25 and layer of partially cured casting material 45 to foredeck 13 or other recipient surface. This step may be accomplished by employing any adhesive that is compatible with casting material and foredeck 13 or other recipient surface. A preferred adhesive is a layer of fluid casting material applied to foredeck 13. The adhesive layer of fluid casting material may be applied by a spray gun, as illustrated in FIG. 11, or with a brush, trowel, or squeegee.

Figure 12:
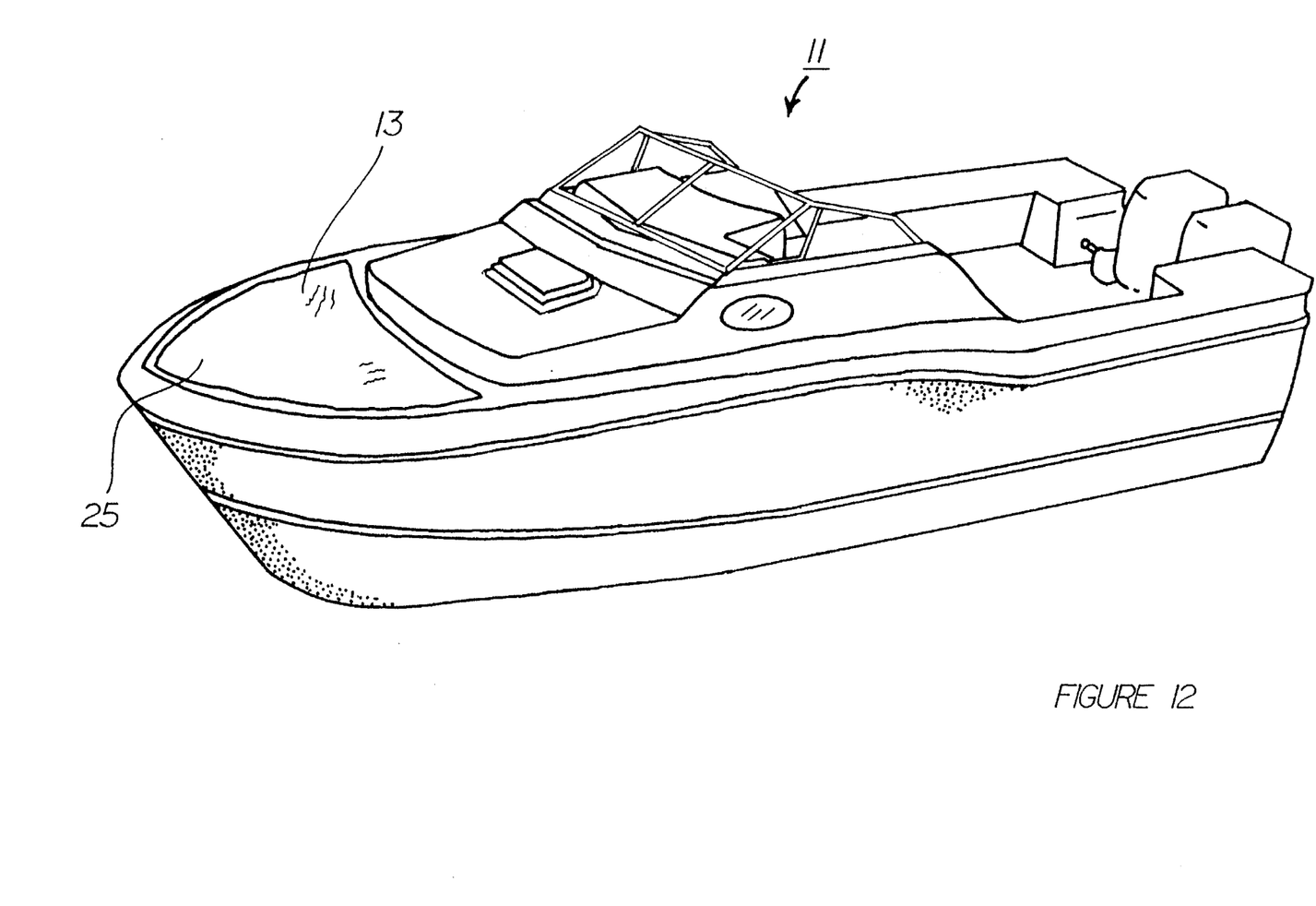

After adhesive layer of casting material is applied to foredeck 13, flexible mold 25 and layer of partially cured casting material 45 are placed on foredeck 13 as illustrated in FIG. 12. If a cardboard or heavy paper pattern previously was secured to flexible mold 25, it should be removed at this point.

Pressure then is applied to the upper surface of flexible mold 25 to expel entrapped gas and to insure a uniform and adequate thickness of partially cured casting material over the foredeck 13 or recipient surface as described above. Preferably, the upper surface of flexible mold 25 is covered with liquid soap to provide the previously mentioned shiny upper surface and compression is applied from the center of flexible mold 25 to the edges to expel entrapped gas and excess casting material. The liquid soap provides a shiny surface to increase reflection of light from flexible mold to facilitate observation of lumps or depressions under flexible mold 25.

After applying compression to flexible mold 25, the edges of flexible mold 25 should be wiped carefully using solvent to remove any excess casting material. Then the edges should be taped down or otherwise secured from curling upward away from layer 45 of casting material. Layer of casting material 45 then is permitted to cure fully.

Figure 13:
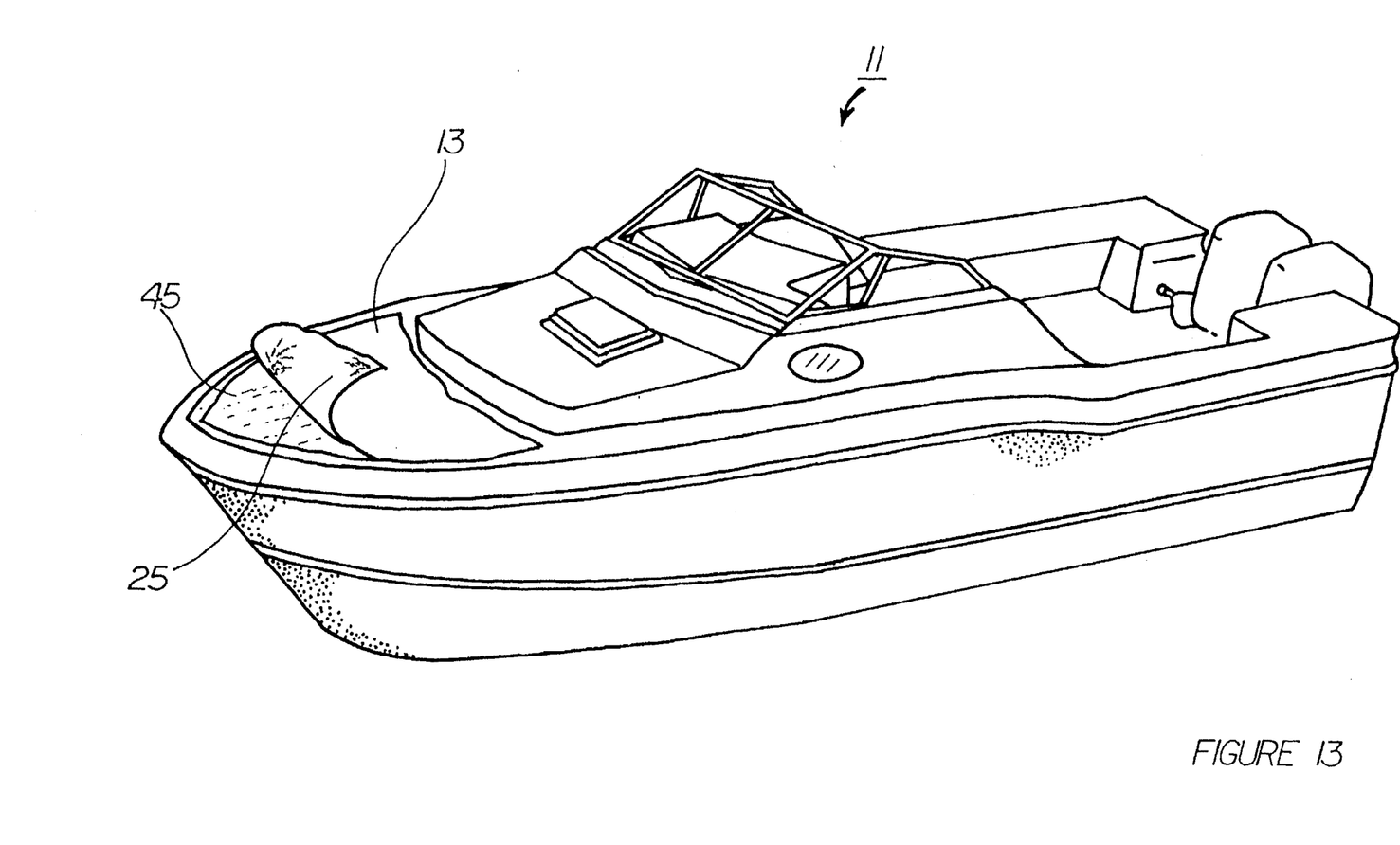

Prior to removal of flexible mold 25, the edges of the mold and resulting surface texture should be wet-sanded and polished as described above. Finishing the surface texture with flexible mold 25 still in place allows flexible mold 25 to protect the underlying surface texture during finishing operations. When fluid casting material 45 is fully cured, flexible mold 25 is removed from foredeck 13 to reveal the underlying newly formed surface texture, as depicted in FIG. 13.

The invention described herein provides the general advantage of a method capable of replicating virtually any surface texture on virtually any contoured surface. The flexible mold described herein permits the method to be practiced on a boat surface having virtually any contour and permits the even distribution of, and expulsion of entrapped gas from, the casting material used in the surface texture formation.

Although the invention has been described with reference to specific embodiments, it will be apparent to those skilled in the art that various modifications may be made without departing from the scope of the invention described herein.

I claim:

1. A method of forming a surface texture on a recipient surface, the method comprising the steps of:

providing a flexible mold having an impression of the surface texture to be formed therein; then applying a layer of fluid polymeric casting material upon the flexible mold; then partially curing the layer of fluid casting material to a flexible state, wherein the impression of the surface texture to be replicated is transferred to the layer of partially cured casting material; then securing the layer of partially cured casting material and the flexible mold to the recipient surface; then fully curing the casting material; and then removing the flexible mold, wherein the layer of fully cured casting material and the surface texture remains on the recipient surface.

2. The method of claim 1 wherein the step of providing a flexible mold further includes forming the flexible mold to be coextensive with the recipient surface.

3. The method of claim 1 wherein the step of applying the layer of fluid casting material comprises spraying gel-coat on the flexible mold.

4. The method of claim 1 wherein the step of securing the flexible mold and the layer of partially cured casting material to the recipient surface further comprises applying a layer of fluid casting material to the recipient surface and placing the layer of partially cured casting material thereon, wherein the layer of fluid casting material serves as an adhesive to secure the layer of partially cured casting material to the recipient surface.

5. The method of claim 1 further comprising the step of applying pressure to the flexible mold to expel entrapped gas from the layer of partially cured casting material.

6. A method of forming a surface texture on a recipient surface, the method comprising the steps of:

providing a flexible mold having an impression of the surface texture therein, the flexible mold being formed to be generally coextensive with the recipient surface; then applying a mold release material to the flexible mold; then applying a layer of fluid polymeric material upon the flexible mold; then partially curing the fluid polymeric material to a flexible state, wherein the impression of the surface texture is transferred to the layer of partially cured polymeric material; then adhering the layer of partially cured polymeric material and the flexible mold to the recipient surface; then applying pressure to the flexible mold to expel entrapped gas from the layer of partially cured polymeric material; then fully curing the polymeric material; and then removing the flexible mold, wherein the layer of fully cured casting material and the surface texture remains on the recipient surface.

7. The method according to claim 6 wherein the recipient surface is a portion of a fiberglass boat hull.

8. The method according to claim 6 wherein the recipient surface is a plug mold for molding fiberglass boat hulls.

9. The method according to claim 6 wherein the fluid polymeric material is gel-coat.

10. A method of forming a surface texture on a fiberglass boat hull surface, the method comprising the steps of:

selecting a recipient surface; then providing a flexible mold that is generally coextensive with the recipient surface, the flexible mold having an impression of the surface texture to be formed thereon; then applying a layer of fluid polymeric material upon the flexible mold; then partially curing the fluid polymeric material to a flexible state, wherein the impression of the surface texture to be formed is transferred to the layer of partially cured polymeric material; then adhering the layer of partially cured polymeric material and the flexible mold to the recipient surface; then applying pressure to the flexible mold to expel entrapped gas from the layer of partially cured polymeric material; then fully curing the layer of partially cured polymeric material; and then removing the flexible mold, wherein the layer of fully cured casting material and the surface texture remains on the recipient surface.

11. The method according to claim 10 wherein the recipient surface is a portion of a plug mold for molding fiberglass boat hulls.

* * * * *